2,919,848
CENTRIFUGAL SEPARATION
Andrew F. Howe, St. Louis, Mo.

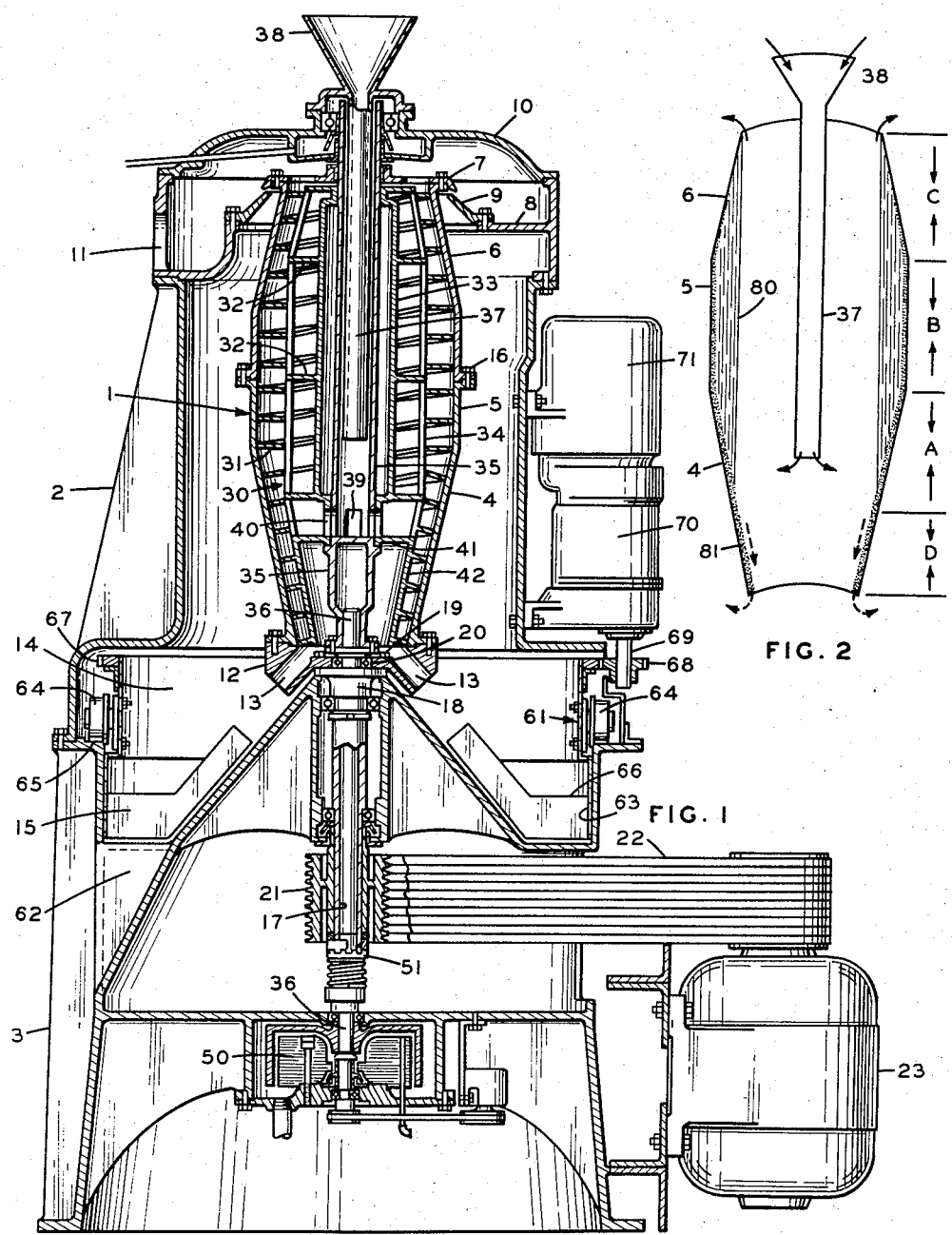

Application March 14, 1956, Serial No. 571,484

3 Claims. (Cl. 233—7)

This invention relates to the separation, by continuous centrifugal action, of solids from a liquid in which they are entrained.

In accordance with this invention, a centrifugal separator includes a rapidly rotating bowl of varying diameters in which there is a bottom or initial section in the form of an inverted truncated cone, joined with a top or final section which is in the form of a truncated cone, preferably with an intermediate cylindrical section. The diameter of the bottom or lesser end of the bottom section is of less diameter than the diameter at the final or top end of the final section, so that the diameter at the top end of the final section defines the inner surface of the material being processed in the bowl, by permitting the liquid component to escape from the bowl over the top edge. A helical conveyor running along all sections of the bowl is arranged and adapted to convey solids, settling against the sides of the bowl, downwardly to the bottom of the bottom or initial section. A tube extends into the bowl to discharge material to be treated near that cross-sectional plane of the initial or bottom section which has a diameter equal to that of the top or final end of the bowl.

The bowl is preferably mounted on a vertical spindle and when so mounted the sections of the bowl may be referred to as bottom and top sections. But the bowl may be mounted on a horizontal spindle, and in that case, the respective sections may be referred to as initial and final sections, since the material to be treated is discharged into the bowl at the initial section and the major component, the liquid, is discharged at the final section.

The material to be treated is rapidly rotated while passing through a succession of annular zones of varying outer diameters defined by the bowl or rotating shell. The material to be treated is deposited near the beginning of the initial zone and then onward or upward through a zone of increasing diameter, then preferably through a zone of constant outer diameter, or cylindrical zone, and thence through a zone of decreasing diameter to the end thereof. The solids deposited against the shell are conveyed downwardly or contrary to the movement of the liquid to a drying zone which is defined by a conical continuation of that part of the shell or bowl forming the initial zone and having a maximum diameter equal to the diameter of the upper or outlet end of the shell. Thus the liquid is permitted to escape at the upper or outlet end of shell while the solids are conveyed downwardly and finally through a dewatering zone, out of contact with the main body of the liquid, to a point or plane of discharge.

It is found that the invention performs most efficiently when the inclination of the conical sections is at approximately 12° from the axis.

The object of the invention is to provide apparatus and method for centrifugal separation of solids from liquids with high capacity and close separation with minimum power.

Having given a brief summary of the invention, a full description is now given of a preferred embodiment of the invention together with its mode of operation, by reference to the accompanying drawings.

Fig. 1 is a vertical sectional view of a machine embodying my invention;

Fig. 2 is a diagrammatical view showing the bowl and its method of operation; and Fig. 3 is a fragmentary view of the lower end of the conveyor.

In the machine specifically shown in the drawing, a bowl 1 is mounted for rotation in a casing 2, upon a base 3. The bowl 1 includes a bottom section 4, in the form of an inverted truncated zone; a cylindrical section 5 having a diameter equal to the largest diameter of the section 4; and a truncated section 6, having its largest diameter equal to the diameter of the cylindrical section 5. It will be seen, therefore, that the bowl is barrel shaped.

It has been found that good results can be obtained by forming the bowl only of the two truncated sections, without the cylindrical section 5, but for reasons which are given later, the cylindrical section 5 is preferred and adds to the efficiency of the device.

As best illustrated in Fig. 2, the top of the bowl is of greater diameter than the bottom. The top of bowl is substantially open and provides an outlet for the liquid component. The diameter at the top of the bowl defines the inner surface of the liquid mass in the bowl. Thus, that mass, under operation, is in the form of an elongated annulus with varying outer diameters but with a constant inner diameter as defined by the diameter at the top of the bowl.

A fitting or spider 7 is secured to the top of the bowl and is open sufficiently to permit the liquid component to flow freely from the bowl.

The top of the casing 2 has a partition member 8 with a detachable inwardly extending annulus 9, over which is a cover 10. These parts form a launder to receive the liquid discharged from the bowl 1, and are also formed, particularly by side opening 11 in the partition member 8 to discharge the liquid component from the machine through that opening.

The bottom of the bowl has a base plate or fitting 12 with ports 13 for the discharge of the solid components into an annular chamber 14 for discharge at a port 15.

The bowl, for convenience in construction and maintenance, is constructed in two parts which are secured together by the screws 16.

The bowl 1 is mounted on a shaft 17 by securing the baseplate 12 to a hub or fitting 18, on the shaft 17, by screws 19. The shaft 17 is mounted in a bearing 20 on the base 3, and is driven through a pulley 21 and belts 22 by a motor 23.

A helical conveyor 30 consists essentially of a pair of intertwined helical plates 31 extending from the top to the bottom of the bowl, with appropriate supporting structure.

The conveyor 30 has spiders or spokes 32, connecting a tubular hub 33 and the plates 31, and longitudinal ribs 34.

The conveyor fits about and is secured to a hollow shaft 35, which is a continuation of and secured to a shaft 36 which is coaxial with and within the drive shaft 17.

A feed tube 37, which has a funnel 38 at its upper end extends within the shaft 35 and terminates above openings 39 in the shaft 35 and openings 40 in the hub 33. The openings 39 and 40 register respectively and are positioned immediately above a plate 41.

It will now be understood that the feed passes through the tube 37 to the openings 39 and 40, whence it is thrown outwardly by centrifugal force, and is guided by the plate 41, so that it is received in the bowl in the bottom section 4 and just above that part of the bowl which has a diameter equal to the diameter of the top of the bowl, which diameter defines the inner surface of the mass of material being treated.

The bottom part of the hub 33, which part extends below the plate 41, is an inverted truncated cone 42 which has its surface attached to the inner edges of the helical plates 31.

The conveyor 30, including the plates 31, spiders 32, hub 33, ribs 34, feed plate 41 and conical hub extension 42 may be cast integrally.

The bowl 1 and the conveyor 30 are rotated at a high rate of speed but with a slight differential in speed. That is to say, the conveyor, depending upon the inclination of the helical blades 31 is intended to operate either at a slightly higher or slightly lower rate than the bowl. In the embodiment shown, the conveyor 30 operates at a slightly lower rate than the bowl 1, the difference in rate being in the order of 30 to 40 r.p.m.

To secure this difference in rotation, an electromagnetic brake 50 is placed on the bottom of the shaft 36. It will be understood that in operation the conveyor 30 has a tendency to rotate with the bowl and by placing a brake upon the shaft 36, to which the conveyor 30 is connected, the required differential in speed can be obtained.

Electro-magnetic brakes are available commercially, which are easily and automatically controllable so as to give the required differential.

A clutch 51, which may be controlled manually or automatically, is provided between the shafts 17 and 36, in order to bring the conveyor 30 up to speed.

It may be understood, however, that the conveyor may be driven directly and the differential in speed obtained between the two shafts 17 and 36 by suitable gearing.

The annular chamber 14 is provided in the base to receive solids discharged from the bottom of the bowl through the ports 13. A rotating plow or scraper 61 is provided to convey the solid around the annulus to the discharge port 15. This scraper includes a cylindrical member 63, supported by rollers 64 which run on an annular track 65, and carry scraper blades 66.

To operate the scraper, a ring gear 67 is attached to the upper part of the cylinder 63, and is engaged by a pinion 68 on the shaft 69, which is driven through a speed reducer 70 by a motor 71.

The method of operation may be described by reference particularly to Fig. 2. The bowl is so constructed that it has three zones in which the liquid mass is rotated. The first zone, A, includes the upper part of the bottom section 4; it being that part which begins at a diameter equal to that at the top of the bowl. The second zone, B, includes that part which is bounded by the cylindrical section 5. And the third zone, C, includes that part which is bounded by the upper conical section 6.

In the drawing, Fig. 2, the arrows with unbroken shanks indicate the path of the feed and the liquid component, while the broken arrows indicate the path of the solids, which movement of the solids, of course, is caused by the conveyor 30.

The inner surface of the liquid mass is indicated by the numeral 80, and the deposit of solids against the wall of the bowl is indicated by the stippling 81.

Feed is conducted to the bowl by the feed tube 37, whence it flows through the openings 39 and 40 onto the plate 41 (Fig. 1), and discharges outwardly along a plane somewhat above the bottom of the zone A. That plane, defined by the plate 41, is positioned only far enough above the bottom of the zone A to prevent substantial splatter of the liquid below that zone.

The heavier and larger particles are deposited quickly against the wall of the bowl within the zone A, and when deposited are arrested partly by adhesion and partly by the blades 31 of the conveyor.

Inasmuch as it takes considerable power to convey the solids downwardly, it is important that the solids, especially the heavier solids, be settled against the wall as quickly as possible or as low as possible in the bowl.

As the mass of liquid moves gradually upwardly in the bowl the settling continues with the inner surface of the liquid becoming more and more clarified, and with the solids moving gradually, depending upon their size and weight, toward the inner surface of the bowl.

As the diameter of the bowl gets larger, and as each solid particle moves farther from the axis, the effective centrifugal force increases so that in the zone B the separation is effeceted by the greatest force. For example, centrifugal force equals $$\frac{MV^2}{r}$$

in which M is mass, V is linear velocity and $r$ is radius. Since the linear velocity is a product of revolution and circumference, it is obvious that with a constant mass and a constant rate of rotation the centrifugal force will increase directly as the radius increases. Under these conditions, the centrifugal force exerted on a single particle in the bowl will be exactly double when it is at a 10 inch radius than it will be at a 5 inch radius.

It may be understood that the separation is affected by the magnitude of the centrifugal force and the length of time it is under that force. Thus it will be understood that the cylindrical portion 6, or zone B increases the efficiency of the device by giving a maximum centrifugal force and also affording a longer interval of time for treatment.

As the mass reaches the top, zone C, the inner surface of the liquid will be clarified, while the solids will tend to be toward the wall of the bowl. As these solids move upwardly, they will strike the conical section of the bowl and adhere thereto. It has been found that there is little deposit on the upper third of the top section 6, that is the zone C.

As the solids are conveyed downwardly by the conveyor 30, they pass out of the liquid zone and past the bottom of zone A into a dewatering zone D, which is defined by a continuation of the conical section 4 below the zone A. In this zone D, the centrifugal action, in effect, squeezes the moisture out of the solids permitting it to run upwardly into the zone A, while the solids are being conveyed continuously toward the bottom of the bowl, for discharge through the ports 13.

As previously stated, it has been found that the invention performs most efficiently when the inclination of the conical section is at approximately 12° from the axis. This small angle of inclination reduces eddy currents to a minimum at the joint between different types of sections, and thereby produces a more nearly perfect separation.

Having this angle of approximately 12° is found to be particularly important in the drying zone D. By using a shell or bowl of this inclination good drying results are obtained, and at the same time the force and energy required for conveying the solids is brought within practical limits.

In the preceding description, some theories of operation have been advanced. While it is believed those theories are correct and practical, it is to be understood that applicant does not intend to bind himself thereby.

Various changes may be made within the scope of the appended claims, some of which have been pointed out, additions and improvements may be made, and the invention may be practiced with less than the maximum efficiency, without departing from the spirit of this invention.

I claim:
1. A centrifugal separator having a bowl, comprising an annular shell with an initial section and a final section, both formed as truncated cones, with the sides inclined radially inward toward the ends of the shell, the diameter of the lesser end of the initial section being substantially less than that of the final section, means for rotating said shell at high speed, means for directing material to be processed axially and then in a radial plane for deposit within the bowl in the region toward the final section adjacent that cross sectional plane of the initial section which has the same diameter as the diameter of the lesser end of the final section, said last-named means comprising a central feed tube extending into the shell from one end thereof, a transverse plate at the inner end of the tube, said plate extending radially outwardly beyond the periphery of the tube adjacent said shell, said tube having side openings adjacent the plate, and a conveyor arranged and adapted to convey solids deposited by centrifugal action along the shell to the extreme outer end of the initial section, whereby the liquid component of the processed material is discharged from the shell at the outer end of the final section, and solid components are discharged at the outer end of said initial section.

2. A centrifugal separator as defined in claim 1, in which said bowl is mounted for rotation on a vertical axis, said bowl being a barrel-shaped shell having a continuous wall defining the periphery thereof, such shell having at its ends said initial section and said final section, the larger inner ends of both said sections being of the same diameter, and an intermediate cylindrical section connecting the inner ends of said end sections.

3. A centrifugal separator as defined in claim 2, the side of the truncated cones of said initial and final sections having an inclination of about 12° with respect to the axis of the bowl.

References Cited in the file of this patent

UNITED STATES PATENTS

| | | |
|---|---|---|
| 1,952,788 | Berlin | Mar. 27, 1934 |
| 2,283,457 | Pecker | May 19, 1942 |
| 2,596,616 | Strezynski | May 13, 1952 |
| 2,740,580 | Schmiedel | Apr. 3, 1956 |
| 2,766,930 | Schmiedel | Oct. 16, 1956 |